Feb. 26, 1963  L. WALLERSTEIN, JR  3,078,971
DAMPED BEAM
Filed Jan. 11, 1960

Leon Wallerstein Jr
INVENTOR.

BY Ralph Hammer
Attorney

United States Patent Office 3,078,971
Patented Feb. 26, 1963

3,078,971
DAMPED BEAM
Leon Wallerstein, Jr., Erie, Pa., assignor to Lord Manufacturing Company, Erie, Pa., a corporation of Pennsylvania
Filed Jan. 11, 1960, Ser. No. 1,460
2 Claims. (Cl. 189—37)

This invention is a beam having two or more metal members connected by an intermediate layer of viscoelastic material which is subjected to shear strain as the beam is deflected. The construction of the metal members is such as to accentuate the shear strain and thereby increase the damping. In some cases the beam is used as a structural member while in other cases it is merely fastened to another structure, such as a panel, for the purpose of damping vibrations in that structure.

Figure 1:
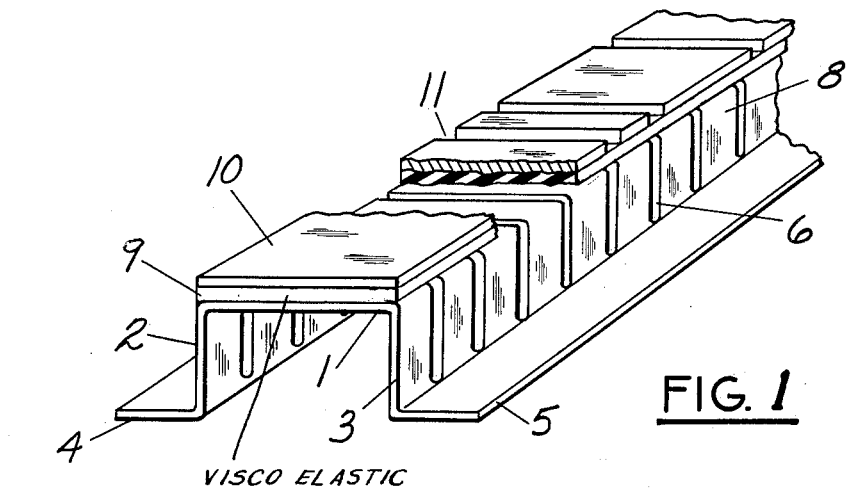
Figure 2:
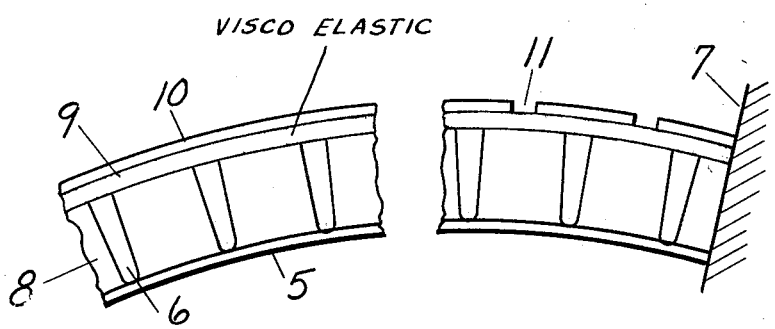

In the drawing, FIG. 1 is a perspective of a beam and FIG. 2 is a side view diagrammatically illustrating the shear strain producing the damping action.

One of the metal members of the beam has its central part of channel section having a web 1 with flanges 2, 3 at each edge transverse to the web. The flanges 2, 3 terminate in outward or transversely extending flanges 4, 5 which may extend toward each other or away from each other as shown. The web and flanges 2, 3 are cut by a series of transverse slots 6 spaced along the length of the member which so weakens the member that the stiffness under bending stress is substantially that due to the flanges 4, 5. The bending action is diagrammatically illustrated in FIG. 2 where the beam is fixed at one end to a rigid support 7 and is deflected as a cantilever beam. It will be noted that the portions 8 between the slots 6 are so rigid as compared to the sections below the bottoms of the slots 6 that under load the bending is primarily confined to the sections at the bottoms of the slots and the portions 8 are not substantially deflected but remain at right angles to the flanges 4, 5. This is indicated in the drawing by an opening up of the slots as shown by the separation of the portions of the slots 6 remote from the flanges 4, 5.

On the web 1 is a layer 9 of viscoelastic material having a stiffness much less than the stiffness of the metal members and having an internal damping much greater than the internal damping of the metal members. The viscoelastic layer may be on the under side of the web 1 or on the upper side as shown. The layer 9 is joined, preferably by an adhesive, to the web 1 and to a metal strip 10 which constitutes the other meal member of the beam. The strip 10 may extend the full length of the beam without interruption or it may be interrupted by one or more slots 11. The strip should at least be long enough to bridge adjacent sections 8 of the other metal member. Whether the strip 10 is continuous throughout the length of the beam or interrupted in various sections as shown, there is a shearing of the viscoelastic layer 9 under bending stress which results in the damping. From one point of view, the sections 8 between the slots 6 and the adjacent portions of the strip 10 constitute rigid members of a shear sandwich of the intervening layer 9 of viscoelastic material. These rigid members are subjected to relative movement as the beam is deflected, producing the shear strain in the viscoelastic layer which results in the damping. The shear strain is accentuated because the bending of the metal members takes place respectively at the plane of the flanges 4, 5 and at the plane of the strip 10.

The presence of the slots 6 is important. If the slots 6 were omitted, under bending stress most of the energy would be stored in the web 1 and flanges 2, 3. This would result in very little shear strain in the viscoelastic layer 9. The beam construction accordingly makes efficient use of the damping properties of the viscoelastic layer due to the accentuation of the shear strain. At the same time, the strength of the beam is surprisingly great. While the strength of the metal members themselves is not great, a substantial part of the strength lost by the slots 6 is regained when the metal members are bonded to the intermediate viscoelastic layer 9.

What is claimed as new is:
1. A damped beam comprising a first structural member having its central part of channel section and having its outer part comprising flanges remote from the web extending transverse to the sides of said channel, said central part having longitudinally spaced transverse slots therein through the web and sides of said channel, a second structural member overlying and in spaced relation to said web and bridging sections of the first member on opposite sides of the slots, and a viscoelastic layer between and joined to said web and said second member.

2. A damped beam comprising a first structural member having its central part of channel section and having its outer part comprising flanges remote from the web extending transverse to the sides of said channel, said central part having at least one slot intermediate its ends through the web and sides of said channel whereby portions on opposite sides of the slot are relatively rigid as compared to the section at the bottom of the slot and under load said first member bends primarily about the section at the bottom of the slot, a second structural member remote from the bottom of the slot and said other flanges and overlying and spaced from the web and bridging said portions of the first member, and a viscoelastic layer between and joined to said web and said second member.

References Cited in the file of this patent
UNITED STATES PATENTS

| | | |
|---|---|---|
| 2,047,493 | Saurer | July 14, 1936 |
| 2,138,176 | Keys | Nov. 29, 1938 |
| 2,638,303 | Pietz | May 12, 1953 |
| 2,675,202 | Kaemmerling | Apr. 13, 1954 |
| 2,767,977 | Paton | Oct. 23, 1956 |

FOREIGN PATENTS

| | | |
|---|---|---|
| 142,244 | Australia | July 16, 1951 |